(12) United States Patent
Kitagawa et al.

(10) Patent No.: US 11,874,000 B2
(45) Date of Patent: Jan. 16, 2024

(54) IMAGING UNIT AND AIR TREATMENT UNIT

(71) Applicant: DAIKIN INDUSTRIES, LTD., Osaka (JP)

(72) Inventors: Keita Kitagawa, Osaka (JP); Atsushi Kondou, Osaka (JP); Takumi Shinkai, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/085,656

(22) Filed: Dec. 21, 2022

(65) Prior Publication Data

US 2023/0117641 A1    Apr. 20, 2023

Related U.S. Application Data

(63) Continuation of application No. PCT/JP2021/018852, filed on May 18, 2021.

(30) Foreign Application Priority Data

Jul. 14, 2020    (JP) .................................. 2020-120956

(51) Int. Cl.
*F24F 11/63* (2018.01)
*F24F 110/20* (2018.01)
*H04N 23/661* (2023.01)

(52) U.S. Cl.
CPC ........... *F24F 11/63* (2018.01); *H04N 23/661* (2023.01); *F24F 2110/20* (2018.01)

(58) Field of Classification Search
CPC ......... F24F 11/63; F24F 2110/20; F24F 11/49
See application file for complete search history.

(56) References Cited

U.S. PATENT DOCUMENTS

| 11,384,946 | B2* | 7/2022 | Suzuki | F24F 11/49 |
| 11,499,728 | B2* | 11/2022 | Handa | F24F 11/38 |
| 2016/0015154 | A1 | 1/2016 | Veeder | |
| 2017/0164720 | A1 | 6/2017 | Veeder | |
| 2019/0014823 | A1* | 1/2019 | Sur | H04N 1/212 |
| 2020/0173670 | A1* | 6/2020 | Suzuki | F24F 11/32 |

(Continued)

FOREIGN PATENT DOCUMENTS

| EP | 2 975 342 A1 | 1/2016 |
| EP | 2 975 343 A1 | 1/2016 |

(Continued)

OTHER PUBLICATIONS

International Preliminary Report on Patentability and English translation of the Written Opinion of the International Searching Authority for International Application No. PCT/JP2021/018852, dated Jan. 26, 2023.

(Continued)

*Primary Examiner* — Nelson J Nieves
(74) *Attorney, Agent, or Firm* — Birch, Stewart, Kolasch & Birch, LLP (57) ABSTRACT

An air treatment unit includes: an imaging device configured to capture an image of an imaging target in a casing of an air treatment device and acquire image data of the imaging target; and a control unit configured to cause the imaging device to capture an image under a condition indicating that there are no mists or fewer mists in the casing, based on a state of the air treatment device.

2 Claims, 8 Drawing Sheets

(56) References Cited

U.S. PATENT DOCUMENTS

| | | |
|---|---|---|
| 2020/0248918 A1 | 8/2020 | Handa et al. |
| 2020/0248924 A1* | 8/2020 | Suzuki ................. F24F 1/0073 |
| 2021/0131690 A1 | 5/2021 | Suzuki et al. |
| 2021/0190357 A1* | 6/2021 | Ishizaka ................. F24F 11/89 |
| 2022/0042709 A1 | 2/2022 | Kataoka |

FOREIGN PATENT DOCUMENTS

| | | |
|---|---|---|
| EP | 2 975 344 A1 | 1/2016 |
| EP | 3 883 883 A1 | 6/2020 |
| JP | 2014-163585 A | 9/2014 |
| JP | 2016-223735 A | 12/2016 |
| JP | 2019-39657 A | 3/2019 |
| JP | 2019-39658 A | 3/2019 |
| JP | 6655908 B2 | 3/2020 |
| JP | 8705522 B1 | 6/2020 |
| WO | WO 2014/142118 A1 | 9/2014 |
| WO | WO 2018/098608 A1 | 5/2018 |

OTHER PUBLICATIONS

International Search Report for PCT/JP2021/018852 dated Jul. 6, 2021.
Written Opinion of the International Searching Authority for PCT/JP2021/018852 dated Jul. 6, 2021.
Extended European Search Report for European Application No. 21843208.6, dated Oct. 9, 2023.

* cited by examiner

IMAGING UNIT AND AIR TREATMENT UNIT

CROSS REFERENCE TO RELATED APPLICATIONS

This application is a Continuation of PCT International Application No. PCT/JP2021/018852, filed on May 18, 2021, which claims priority under 35 U.S.C. 119(a) to Patent Application No. 2020-120956, filed in the Japan on Jul. 14, 2020, all of which are hereby expressly incorporated by reference into the present application.

TECHNICAL FIELD

The present disclosure relates to an imaging unit and an air treatment unit.

BACKGROUND ART

Patent Document 1 discloses an air treatment device configured to acquire image data of components in a casing, using an imaging device. An operator, for example, can grasp the state of the components by checking the image data acquired by the imaging device.

CITATION LIST

Patent Document

Patent Document 1: Japanese Unexamined Patent Publication No. 2019-39658

SUMMARY

A first aspect is directed to an imaging unit including: an imaging device (41) configured to capture an image of an imaging target (T) in a casing (25) of an air treatment device (10) and acquire image data of the imaging target (T); and a control unit (45) configured to cause the imaging device (41) to capture an image under a condition indicating that there are no mists or fewer mists in the casing (25), based on a state of the air treatment device (10).

DESCRIPTION OF EMBODIMENT

Embodiments of the present disclosure will be described below with reference to the drawings. The following embodiments are merely exemplary ones in nature, and are not intended to limit the scope, applications, or use of the present invention.

First Embodiment

An air treatment system (1) according to a first embodiment will be described.

<General Configuration of Air Treatment System>

Figure 1:
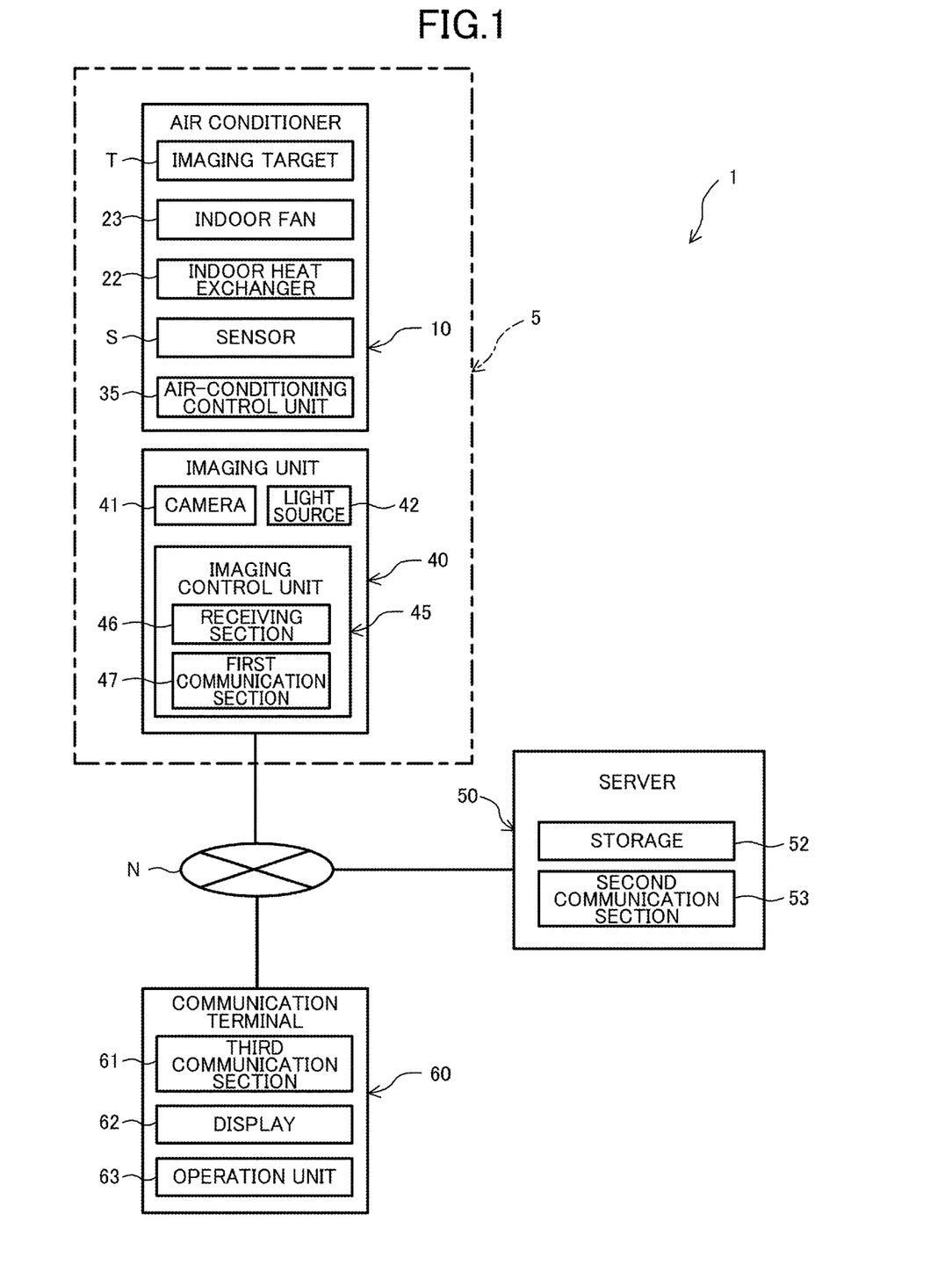
FIG. 1 is a block diagram illustrating a general configuration of an air treatment system according to a first embodiment.

As illustrated in FIG. 1, the air treatment system (1) of the first embodiment includes an air treatment unit (5) and a server (50). The air treatment unit (5) includes an air conditioner (10) and an imaging unit (40). The imaging unit (40) and the server (50) are connected to the Internet (N). A communication terminal (60) of an operator is connected to the Internet (N). Examples of the operator include those who maintain the air conditioner (10) and control the air conditioner (10) and a user of the air conditioner (10). Examples of the communication terminal (60) include a personal computer, a smartphone, a tablet terminal, and a mobile phone.

According to the air treatment system (1) of the first embodiment, the imaging unit (40) captures an image of an imaging target (T) of the air conditioner (10). The image data acquired by the imaging unit (40) is transmitted to the server (50) via the Internet (N). The operator can check the image data outputted from the server (50) visually using the communication terminal (60).

<General Configuration of Air Conditioner>

The air conditioner (10) conditions air in an indoor space, which is a target space. The air conditioner (10) adjusts the temperature of room air (RA) in the indoor space. The air conditioner (10) supplies temperature-adjusted air as supply air (SA) into the indoor space. The air conditioner (10) performs a cooling operation and a heating operation.

Figure 2:
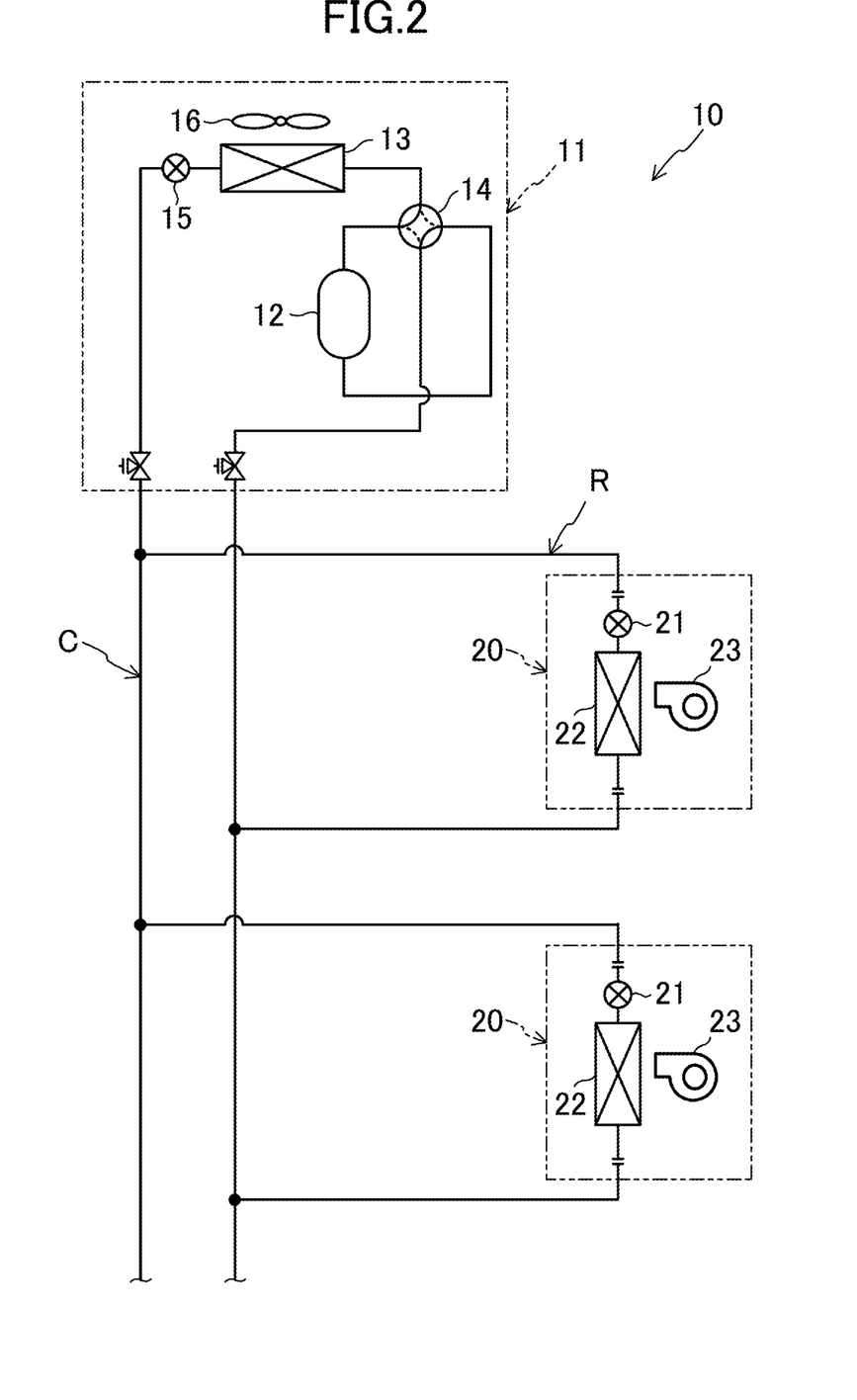
FIG. 2 is a piping system diagram illustrating an air conditioner according to the first embodiment.

As illustrated in FIG. 2, the air conditioner (10) is of a multiple type. The air conditioner (10) includes an outdoor unit (11) and a plurality of indoor units (20). The air conditioner (10) may be of a pair type including one outdoor unit (11) and one indoor unit (20). The outdoor unit (11) is installed in the outdoor space. The indoor units (20) are installed in the indoor space. Specifically, the indoor units (20) are installed in a space behind the ceiling facing the indoor space. The air conditioner (10) includes a refrigerant circuit (R). The refrigerant circuit (R) is configured by connecting the outdoor unit (11) and the plurality of indoor units (20) via a connection pipe (C).

The refrigerant circuit (R) includes a refrigerant. The refrigerant circulates in the refrigerant circuit (R), thereby performing a vapor compression refrigeration cycle. The refrigerant circuit (R) includes a compressor (12), an outdoor heat exchanger (13), an indoor expansion valve (21), and an indoor heat exchanger (22). The refrigerant circuit (R) has a four-way switching valve (14) and an outdoor expansion valve (15).

The outdoor unit (11) is provided with the compressor (12), the outdoor heat exchanger (13), the four-way switching valve (14), and the outdoor expansion valve (15). The outdoor unit (11) is provided with an outdoor fan (16). The compressor (12) compresses the refrigerant. The compressor (12) has an electric motor, the number of rotations of which is variable. The outdoor heat exchanger (13) exchanges heat between the refrigerant and outdoor air. The outdoor expansion valve (15) is an electronic expansion valve that decompresses the refrigerant. The outdoor fan (16) transfers the outdoor air passing through the outdoor heat exchanger (13).

The four-way switching valve (14) switches between a first state indicated by solid curves in FIG. 2 and a second state indicated by broken curves in FIG. 2. The four-way switching valve (14) in the first state makes a discharge portion of the compressor (12) and a gas end of the outdoor heat exchanger (13) communicate with each other, and makes a suction portion of the compressor (12) and a gas end of the indoor heat exchanger (22) communicate with each other. The four-way switching valve (14) in the second state makes the discharge portion of the compressor (12) and the gas end of the indoor heat exchanger (22) communicate with each other, and makes the suction portion of the compressor (12) and the gas end of the outdoor heat exchanger (13) communicate with each other.

Each of the indoor unit (20) is provided with the indoor expansion valve (21) and the indoor heat exchanger (22). The indoor unit (20) is provided with an indoor fan (23). The indoor expansion valve (21) is an electronic expansion valve that decompresses the refrigerant. The indoor fan (23) transfers room air passing through the indoor heat exchanger (22).

<Indoor Unit>

A configuration of the indoor unit (20) will be described with reference to FIGS. 3 and 4. In the following description, the terms "front," "rear," "right," "left," "upper," and "lower" are based on a case where a front panel (25a) of a casing (25) is viewed from the front.

The indoor unit (20) includes a casing (25), the indoor fan (23), indoor heat exchanger (22), a tray (26), and a pump (27). The casing (25) is installed behind the ceiling. The indoor fan (23), the indoor heat exchanger (22), the tray (26) and the pump (27) are disposed inside the casing (25).

<Casing>

The casing (25) has a shape of a rectangular parallelepiped hollow box. An intake port (28) is formed in a right-side panel (25b) of the casing (25). A suction duct (not shown) is connected to the intake port (28). An inflow end of the suction duct communicates with the indoor space. A blow-out port (29) is formed in a left-side panel (25c) of the casing (25). A blow-out duct (not shown) is connected to the blow-out port (29). An outflow end of the blow-out duct communicates with the indoor space.

An air flow path (30) is formed in the casing (25) from the intake port (28) to the blow-out port (29). The indoor fan (23) and the indoor heat exchanger (22) are disposed in the air flow path (30).

The front panel (25a) of the casing (25) faces a maintenance space. The maintenance space is a workspace. An inspection hole (31) is formed in the front panel (25a). An inspection cover (32) is detachably attached to the inspection hole (31).

The tray (26) and the pump (27) are disposed behind the inspection hole (31). The tray (26) and the pump (27) are exposed to the outside of the casing (25) through the inspection hole (31).

<Indoor Fan>

The indoor fan (23) is disposed upstream of the indoor heat exchanger (22) in the air flow path (30). The indoor fan (23) corresponds to a fan of the present disclosure. The indoor fan (23) is a sirocco fan. The indoor fan (23) transfers air in the air flow path (30).

<Indoor Heat Exchanger>

The indoor heat exchanger (22) is a fin-and-tube heat exchanger. The indoor heat exchanger (22) is an air heat exchanger that allows heat exchange between the air in the air flow path (30) and the refrigerant. The indoor heat exchanger (22) is disposed with longitudinal direction of fins tilted (see FIG. 4).

Folded portions of a heat transfer tube (not shown) of the indoor heat exchanger (22) and a flow divider (not shown) connected to the indoor heat exchanger (22) are disposed in a first space (S1) to be described in detail later.

<Tray>

The tray (26) is disposed below the indoor heat exchanger (22). The tray (26) is a pan that is open upward. The tray (26) receives condensed water generated in the vicinity of the indoor heat exchanger (22). The tray (26) is a component in the casing (25). The tray (26) is an imaging target (T) of a camera (41). The tray (26) is made of a resin material.

<Pump>

The pump (27) is disposed in the tray (26). The pump (27) is used to discharge water in the tray (26). A drain pipe (27a) is connected to an upper portion of the pump (27). The water sucked into the pump (27) is discharged to the outside of the casing (25) via the drain pipe (27a). The pump (27) is a component in the casing (25). The pump (27) is an imaging target (T) of the camera (41).

<Partition>

The indoor unit (20) has a partition that defines a front space (S1). As illustrated in FIGS. 3 and 4, the partition includes a first partition plate (25d), a second partition plate (25e), and a third partition plate (25f).

The first partition plate (25d) extends from the front panel (25a) of the casing (25) along the right edge of the indoor heat exchanger (22). In other words, the first partition plate (25d) extends across the air flow path (30) from the front panel (25a) of the casing (25). The first partition plate (25d) extends from the bottom plate to the top panel of the casing (25).

The second partition plate (25e) covers a front side of a space (a downstream-side air flow path (30b)) in the air flow path (30) on the downstream side (the left side in FIG. 4) of the indoor heat exchanger (22). The second partition plate (25e) has substantially a rectangular shape. The second partition plate (25e) extends from the bottom plate to the top panel of the casing (25). The second partition plate (25e) is arranged to be substantially flush with the front end of the indoor heat exchanger (22). The second partition plate (25e) separates the downstream-side air flow path (30b) and the front space (S1) from each other.

A space (an upstream-side air flow path (30a)) in the air flow path (30) on the upstream side (the right side in FIG. 4) of the indoor heat exchanger (22) is not covered with a partition plate. The upstream-side air flow path (30a) and the front space (S1) therefore communicate with each other.

The third partition plate (25f) is configured as part of the left-side panel (25c) of the casing (25). The third partition plate (25f) is closer to the front than the blow-out port (29).

The front space (S1) is defined by the first partition plate (25d), the second partition plate (25e), and the third partition plate (25f). The front space (S1) is a first space different from the air flow path (30). The front space (S1) communicates with the upstream-side air flow path (30a) of the air flow path (30) and is blocked from the downstream-side air flow path (30b). Air in the upstream-side air flow path (30a) flows into the front space (S1). However, air tends to remain in the front space (S1) more than in the air flow path (30).

<Electric Component Box>

Figure 3:
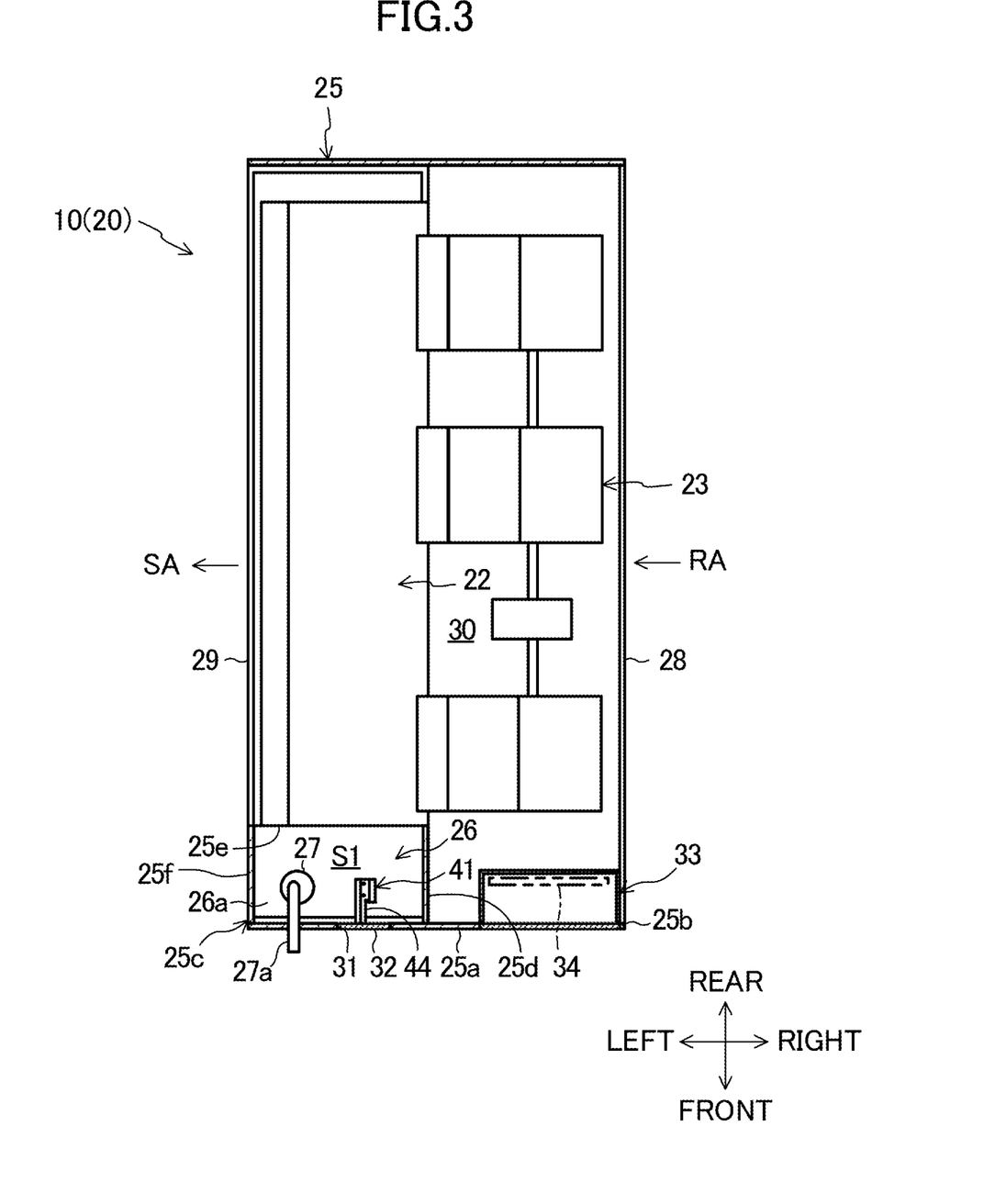
FIG. 3 is a diagram illustrating a plan view of an indoor unit according to the first embodiment.
Figure 4:
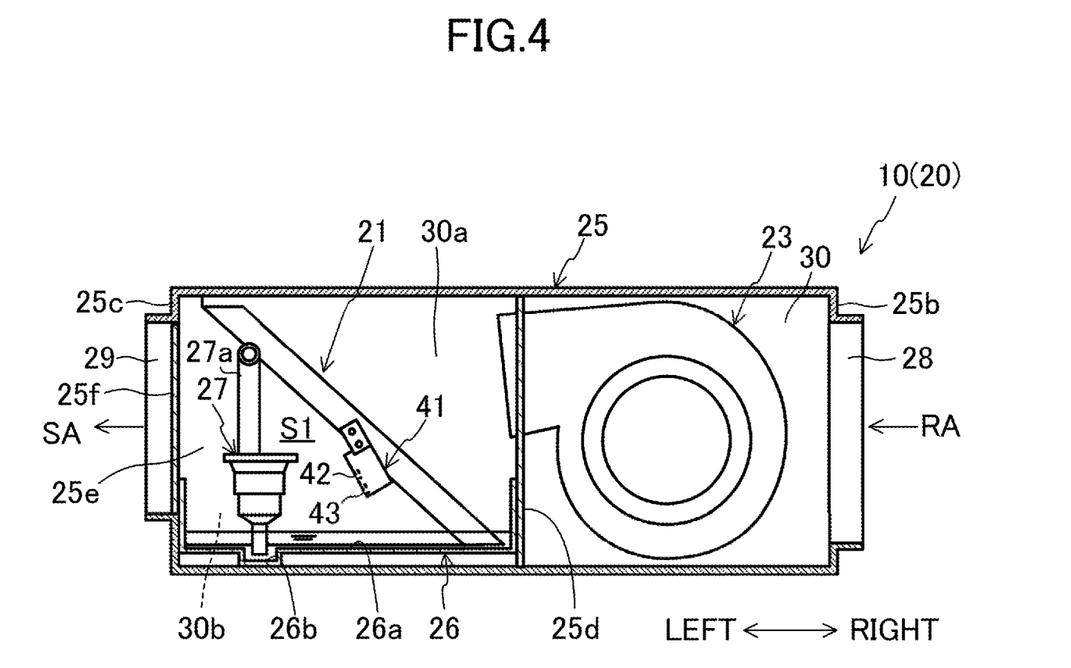
FIG. 4 is a diagram illustrating the inside of the indoor unit according to the first embodiment, as viewed from the front.

As illustrated in FIG. 3, an electric component box (33) is disposed in the casing (25) so as to be close to the front panel (25a). A control board (34) that corresponds to the air conditioner (10) is housed in the electric component box (33).

<Sensor>

As illustrated in FIG. 1, the air conditioner (10) includes various types of sensors (S).

The sensors (S) include air sensors configured to detect a physical quantity of the air in the casing (25). The air sensors include an air temperature sensor configured to detect a temperature of the air, an air humidity sensor configured to detect a humidity of the air, and an air speed sensor configured to detect a speed of the air. At least one of these sensors (S) may be disposed in the air flow path (30). In this case, the at least one sensor (S) is disposed in the air flow path (30) near the intake port (28). At least one of these sensors (S) may be disposed in the first space (front space (S1)) different from the air flow path (30).

The sensors (S) include a heat exchanger temperature sensor configured to detect a temperature of the indoor heat exchanger (22) (strictly, a surface temperature of the indoor heat exchanger (22)). The sensors (S) include refrigerant temperature sensors configured to detect a temperature of the refrigerant flowing through the indoor heat exchanger (22). The refrigerant temperature sensors include a sensor configured to detect an evaporation temperature or a condensation temperature of the indoor heat exchanger (22). The refrigerant temperature sensors include not only the sensor configured to detect a temperature of the refrigerant (e.g., a thermistor), but also a refrigerant pressure sensor configured to detect a pressure of the refrigerant in a broad sense, because it is possible to obtain an evaporation temperature and a condensation temperature from a saturation temperature that corresponds to the pressure of the refrigerant detected by the refrigerant pressure sensor.

<Air-Conditioning Control Unit>

As illustrated in FIG. 1, the indoor unit (20) has an air-conditioning control unit (35). The air-conditioning control unit (35) includes a microcomputer and a memory device which are mounted on the control board (34). The memory device stores software for operating the microcomputer. The air-conditioning control unit (35) controls constituent components of the air conditioner (10).

<General Configuration of Imaging Unit>

As illustrated in FIG. 1, the imaging unit (40) includes the camera (41) and an imaging control unit (45). The camera (41) corresponds to the imaging device of the present disclosure. The imaging unit (40) is installed in a space behind the ceiling together with the indoor unit (20).

<Camera>

The camera (41) acquires image data of an imaging target (T). The camera (41) is disposed in the casing (25). Specifically, the camera (41) is disposed in the front space (S1). The camera (41) is disposed between the inspection cover (32) and the indoor heat exchanger (22), when viewed from above. The camera (41) is supported to the back surface of the inspection cover (32) via a stay (44). As illustrated in FIG. 4, the camera (41) includes a lens (42) and a light source (43). The lens (42) is a super-wide-angle lens. The lens (42) of the camera (41) faces diagonally down so as to be directed to a bottom surface (26a) of the tray (26). Specifically, the lens of the camera (41) is directed to a recess (26b) formed in the bottom surface of the tray (26) so as to correspond to an intake portion of the pump (27).

The light source (43) illuminates an imaging target (T). Specifically, the light source (43) illuminates an imaging target (T) when the camera (41) captures an image of the imaging target (T). Thus, the camera (41) can acquire image data of the imaging target (T) at the timing when the imaging target (T) is illuminated by the light source (43). The light source (43) may be separate from the camera (41).

<Imaging Control Unit>

The imaging control unit (45) corresponds to a control unit of the present disclosure. The imaging control unit (45) is separate from the air-conditioning control unit (35). The imaging control unit (45) is capable of communicating with the air-conditioning control unit (35) in a wired or wireless manner.

The imaging control unit (45) includes a microcomputer and a memory device. The memory device stores software for operating the microcomputer. The imaging control unit (45) controls the camera (41) and the light source (43). In other words, the imaging control unit (45) supplies power for operating the camera (41) and the light source (43) to the camera (41) and the light source (43). The imaging control unit (45) has a receiving section (46) and a first communication section (47).

The receiving section (46) receives a first signal from the air-conditioning control unit (35). The first signal is a signal indicating the state of the air conditioner (10). The first signal includes at least one of a signal indicating an operating state of the air conditioner (10), a signal indicating an operating state of elemental components of the air conditioner (10), a signal indicating an operation parameter of the air conditioner (10), and a detection signal of any one of the various sensors (S). The elemental components include the indoor fan (23) and the indoor heat exchanger (22).

The imaging control unit (45) causes the camera (41) to capture an image under a condition indicating that there are no mists or fewer mists in the casing (25) (hereinafter referred to as "first condition") based on the first signal received in the receiving section (46).

The first communication section (47) is connected to the camera (41) via a wired or wireless communication line. The first communication section (47) receives the image data acquired by the camera (41). The first communication section (47) is connected to the Internet (N) via a communication line using long term evolution (LTE). The first communication section (47) outputs the image data to the server (50) via the Internet (N). The first communication section (47) may be connected to the Internet (N) via a wireless router.

<Server>

The server (50) is hosted on the cloud of the Internet (N). The server (50) includes a microcomputer and a memory device. The memory device stores software for operating the microcomputer. The server (50) has a storage (52) and a second communication section (53).

The second communication section (53) includes a receiving section configured to receive the image data transmitted from the imaging unit (40). The second communication section (53) includes a transmitting section configured to transmit the image data stored in the storage (52) to the communication terminal (60).

The storage (52) stores the image data received in the second communication section (53). The storage (52) includes at least one of a secure digital (SD) memory card, a universal serial bus (USB) flash memory, a hard disk drive (HDD), a random access memory (RAM), and a solid state drive (SSD).

<Communication Terminal>

The communication terminal (60) is a terminal operated by an operator. The communication terminal (60) has a third communication section (61), a display (62), and an operation unit (63).

The third communication section (61) includes a receiving section configured to receive the image data transmitted from the server (50). The third communication section (61) includes a transmitting section configured to transmit a command instructing the server (50) to output the image data.

The display (62) is configured as, for example, a liquid crystal monitor. Image data of an imaging target (T) is displayed on the display (62). Strictly, the image data outputted from the server (50) is displayed on the display (62).

The operation unit (63) is a keyboard, a touch panel, or the like. The operator operates the operation unit (63) to operate application software stored in the communication terminal (60). The operator can transmit the command instructing the server (50) to output the image data, or display the image data on the display (62), through the operation of the application software.

—Operation—

An operation of the air conditioner (10) according to the first embodiment will be described. The air conditioner (10) performs a cooling operation and a heating operation.

<Cooling Operation>

In the cooling operation, the four-way switching valve (14) is in the first state. The refrigerant compressed in the compressor (12) dissipates heat (condenses) in the outdoor heat exchanger (13) and is decompressed by the indoor expansion valve (21). The decompressed refrigerant evaporates in the indoor heat exchanger (22) and is compressed again in the compressor (12).

When the indoor fan (23) is operated, room air (RA) is sucked into the air flow path (30) through the intake port (28). The air in the air flow path (30) passes through the indoor heat exchanger (22). In the indoor heat exchanger (22), the air is cooled by the evaporating refrigerant. The cooled air passes through the blow-out port (29), and is then supplied as supply air (SA) to the indoor space.

If the air is cooled to a temperature equal to or lower than the dew point in the indoor heat exchanger (22), moisture in the air condenses. A tray (26) receives this condensed water. The condensed water received by the tray (26) is discharged to the outside of the casing (25) by the pump (27).

In the cooling operation, the air-conditioning control unit (35) controls the evaporation temperature of the indoor heat exchanger (22) so that the indoor temperature approaches a target temperature. The indoor temperature is detected by a temperature sensor provided, for example, at the intake port (28). The target temperature is determined based on a set temperature set by a user with a remote control. The evaporation temperature is obtained from values detected by the refrigerant temperature sensor and the refrigerant pressure sensor.

<Heating Operation>

In the heating operation, the four-way switching valve (14) is in the second state. The refrigerant compressed in the compressor (12) dissipates heat (condenses) in the indoor heat exchanger (22) and is decompressed by the outdoor expansion valve (15). The decompressed refrigerant evaporates in the outdoor heat exchanger (13) and is compressed again in the compressor (12).

When the indoor fan (23) is operated, room air (RA) is sucked into the air flow path (30) through the intake port (28). The air in the air flow path (30) passes through the indoor heat exchanger (22). In the indoor heat exchanger (22), the air is heated by the refrigerant dissipating heat. The heated air is then supplied to the indoor space as supply air (SA) through the blow-out port (29).

In the heating operation, the air-conditioning control unit (35) controls the condensation temperature of the indoor heat exchanger (22) so that the indoor temperature approaches a target temperature. The condensation temperature is obtained from values detected by the refrigerant temperature sensor and the refrigerant pressure sensor.

<Generation of Mists in Casing>

Mists may be generated in the casing (25) depending on the state of the indoor unit (20). Conditions where mists are generated will be illustrated below.

Specific examples where Condition 1) is met include:

1a) immediately after the end of a cooling operation; 1b) immediately after the start of a cooling operation; 1c) when the user suddenly drops the set temperature for a cooling operation; 1d) when an oil return operation is performed; and 1e) when a reverse cycle defrosting operation is performed.

Regarding 1a), the indoor fan (23) stops when the cooling operation ends. If air in the indoor space is taken into the casing (25) in this state, the air may be cooled to a temperature equal to or lower than the dew point by the indoor heat exchanger (22) serving as an evaporator. The air tends to be cooled to a temperature equal to or lower than the dew point by the indoor heat exchanger (22) particularly when a pump-down operation is performed at the end of the cooling operation. The pump-down operation used herein refers to an operation in which the compressor (12) is driven for a predetermined period in order to draw out the refrigerant accumulated in the indoor heat exchanger (22). The pressure of the refrigerant in the indoor heat exchanger (22) drops steeply with the pump-down operation. When the temperature in the indoor heat exchanger (22) drops with this pressure drop of the refrigerant, the air in the casing (25) tends to be cooled to a temperature equal to or lower than the dew point.

Regarding 1b), the temperature of the indoor heat exchanger (22) serving as an evaporator drops steeply, immediately after the start of the cooling operation. Thus, the air tends to be cooled to a temperature equal to or lower than the dew point.

Regarding 1c), the evaporation temperature of the indoor heat exchanger (22) drops abruptly when the user lowers the set temperature abruptly. Thus, the air tends to be cooled to a temperature equal to or lower than the dew point.

Regarding 1d), the oil return operation refers to an operation of increasing the number of rotations of the compressor (12) to return oil accumulated in the indoor heat exchanger (22) to the compressor (12). The evaporation temperature of the indoor heat exchanger (22) is lowered by the increase in the number of rotations of the compressor (12). Thus, the air tends to be cooled to a temperature equal to or lower than the dew point.

Regarding 1e), the reverse cycle defrosting operation is performed during a heating operation in winter, for example. The reverse cycle defrosting operation refers to an operation for defrosting the outdoor heat exchanger (13). In the reverse cycle defrosting operation, similarly to the cooling operation, a refrigeration cycle is performed in which the refrigerant compressed in the compressor (12) dissipates heat and condenses in the outdoor heat exchanger (13) and evaporates in the indoor heat exchanger (22). When the indoor heat exchanger (22) serving as a condenser in the heating operation turns to function as an evaporator in the reverse cycle defrosting operation, the air tends to be cooled to a temperature equal to or lower than the dew point.

2) When relatively low temperature air in the casing (25) is mixed with relatively high temperature air entering the casing (25) from the indoor space. In this case, the air that has entered the casing (25) from the indoor space is cooled to a temperature equal to or lower than the dew point by the low temperature air, which generates mists. The air in the casing (25) is cooled in the indoor heat exchanger (22) and is also cooled by low temperature water accumulated in the tray (26), causing a drop of the temperature of the air in the casing (25).

Further, if the above-mentioned conditions 1a), 1b), 1c), 1d), and 1e) are met, the temperature of the indoor heat exchanger (22) and/or the temperature of the water accumulated in the tray (26) drop. As a result, the temperature of air in the casing (25) easily drops.

3) When relatively high temperature air in the casing (25) is cooled by relatively low temperature air in the indoor space to a temperature equal to or lower than the dew point. In this case, moisture in the air condenses, and mists are generated in the casing (25). During a heating operation or after the end of the heating operation, for example, the temperature of air in the casing (25) is relatively high. The condition 3) is met in this state if relatively low temperature air enters the indoor space and the relatively low temperature air is taken into the casing (25). If the indoor unit (20) is installed at a lower portion of the indoor space (e.g., floor standing type), cold air tends to come into the casing due to convection of heat.

—Control Operation of Air-Conditioning System—

The image data captured by the camera (41) may be fogged due to mists generated in the casing (25) as described above. In the first embodiment, in particular, the camera (41) and the imaging target (T) are disposed in the front space (S1) that is different from the air flow path (30). Mists tend to remain in the front space (S1) since not as much air as in the air flow path (30) flows in the front space (S1).

The operator cannot inspect the imaging target (T) well if the image data is unclear due to the generation of mists. Thus, the imaging control unit (45) causes the camera (41) to capture an image under the first condition indicating that there are no mists or fewer mists in the casing (25). In other words, the imaging control unit (45) causes the camera (41) to capture an image when the first condition indicating that there are no mists or fewer mists in the casing (25) is met.

<Operation of Imaging Unit>

Figure 5:
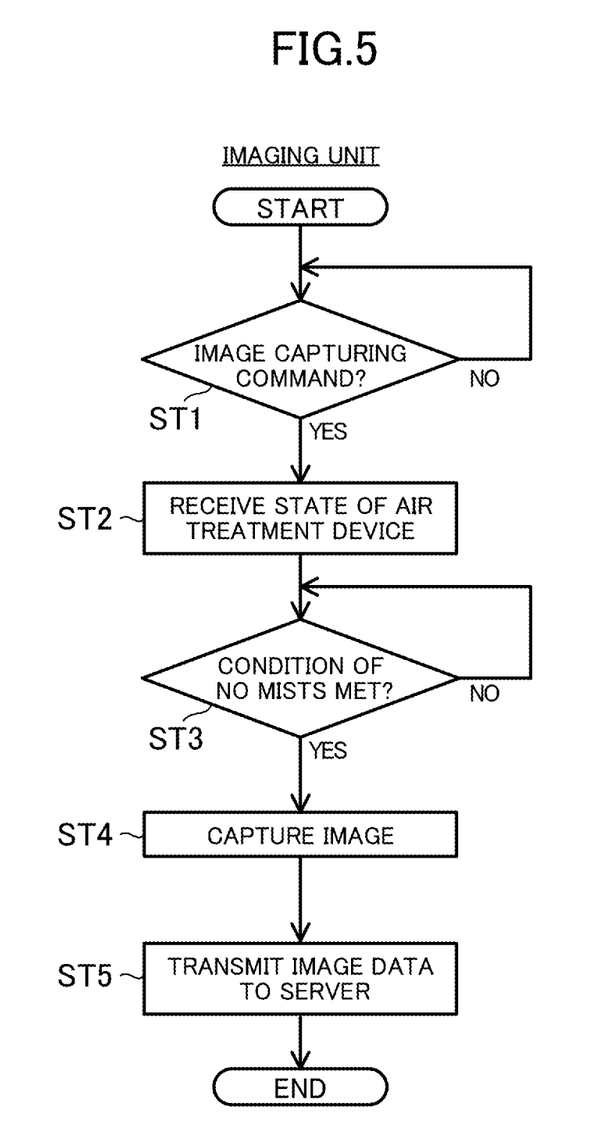
FIG. 5 is a flowchart showing operations of an imaging unit.

As illustrated in FIG. 5, when an image capturing command is input in the imaging control unit (45) (YES in Step ST1), the process proceeds to Step ST2. The image capturing command used herein refers to a command causing the camera (41) to capture an image. The image capturing command is input to the imaging control unit (45) when, for example, setting time on timer has elapsed or a set time is reached.

In Step ST2, the first signal indicating the state of the air treatment device (10) is input to the receiving section (46).

In Step ST3, the imaging control unit (45) determines whether the first condition indicating that there are no mists or fewer mists in the casing (25) is met, based on the state of the air treatment device (10). If the first condition is met (YES in Step ST3), the imaging control unit (45) causes the camera (41) to capture an image (Step ST4). Details of the first condition will be described later. In this example, the camera (41) is prohibited from capturing a picture until the first condition is met.

In Step ST5, the first communication section (47) transmits the acquired image data to the server (50).

<Operation of Server>

Figure 6:
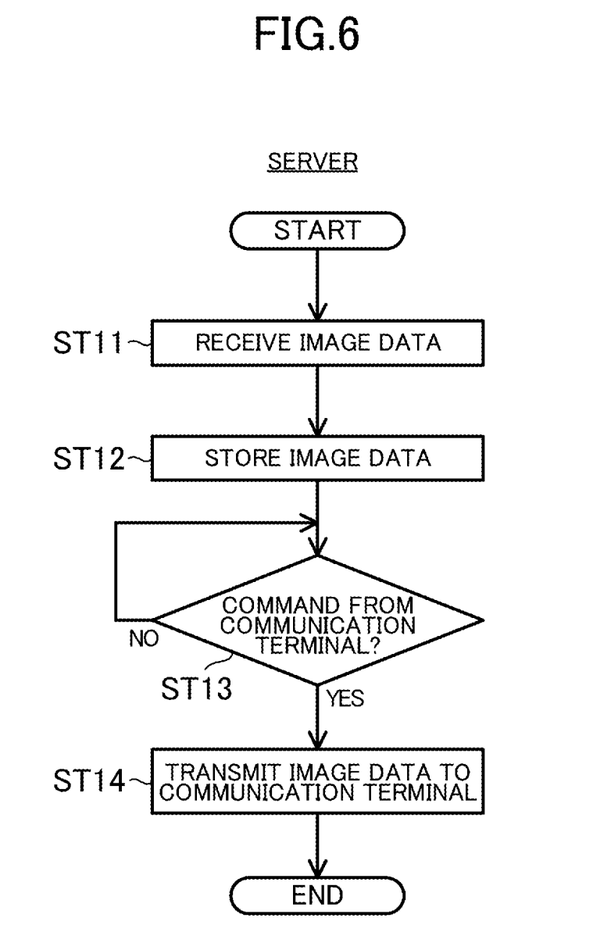
FIG. 6 is a flowchart showing basic operations of an image processor.

As illustrated in FIG. 6, the server (50) receives the image data transmitted from the imaging unit (40) (Step ST11). Then, the server (50) stores the received image data in the storage (52) (Step ST12).

After that, when the server (50) receives a command from the communication terminal (60) (YES in Step ST13), the image data is transmitted to the communication terminal (60) (Step ST14). The operator checks the image data via the display (62). Thus, the operator can inspect the imaging target (T) via the communication terminal (60).

<Details of First Condition>

The first condition indicating that there are no mists or fewer mists in the casing (25) will be explained first.

The first condition includes the following Condition A, Condition B, Condition C, and Condition D.

Condition A) The indoor fan (23) is in operation.

When the indoor fan (23) is in operation, the air in the casing (25) is transferred by the fan (23, 71). Therefore, even if mists are generated in the casing (25), the mists are discharged promptly to the outside of the casing (25) together with the air. This means that Condition A is a condition indicating that there are no mists or fewer mists in the casing (25).

Condition B) Amount of change ΔTa in temperature of the indoor heat exchanger (22) in a predetermined period is a first predetermined value or less, or amount of change ΔTb in temperature of the refrigerant flowing in the indoor heat exchanger (22) in a predetermined period is a second predetermined value or less.

The air in the casing (25) is cooled abruptly if the temperature in the indoor heat exchanger (22) or the temperature of the refrigerant flowing in the indoor heat exchanger (22) greatly drops. As a result, moisture in the air condenses, and mists tend to be generated. However, the air is not cooled abruptly if the amount of change ΔTa in a predetermined period is a first predetermined value or less. Alternatively, the air is not cooled abruptly if the amount of change ΔTb in a predetermined period is a second predetermined value or less. This means that Condition B is a condition indicating that there are no mists or fewer mists in the casing (25).

For example, Condition B is met if the amount of change ΔTa in the predetermined period (10 minutes) is 1° C., which is the first predetermined value, or less. Alternatively, Condition B is met if the amount of change ΔTb in the predetermined period (10 minutes) is 1° C., which is the second predetermined value, or less.

Condition C) Temperature Ta of the indoor heat exchanger (22) or temperature Tb of the refrigerant in the indoor heat exchanger (22) is higher than a dew point temperature Td of the air in the casing (25).

If the temperature Ta or the temperature Tb is a temperature equal to or lower than the dew point of air in the casing (25), moisture in the air condenses, and mists tend to be generated. In contrast, if the temperature Ta or the temperature Tb is higher than the dew point temperature Td of air in the casing (25), moisture in the air does not condense, and mists are not generated. This means that Condition C is a condition indicating that there are no mists or fewer mists in the casing (25).

Condition D) Dew point temperature Td of air in the casing (25) is equal to or lower than a predetermined value.

If the dew point temperature Td of air in the casing (25) is equal to or lower than a predetermined value, moisture in the air is less likely to condense, and mists are less likely to be generated, even when the air is cooled by the indoor heat exchanger (22). This means that Condition D is a condition indicating that there are no mists or fewer mists in the casing (25).

The imaging control unit (45) causes the camera (41) to capture an image when at least one of Condition A, Condition B, Condition C, or Condition D is met. The imaging control unit (45) may cause the camera (41) to capture an image when two or three of these four conditions are met. The imaging control unit (45) may cause the camera (41) to capture an image when all these conditions are met.

<Determination Method as to First Condition>

Next, a specific determination method as to the first condition will be described. The imaging control unit (45) determines whether the first condition is met, based on the first signal outputted from the air-conditioning control unit (35).

Condition A) The imaging control unit (45) determines whether Condition A is met, based on the first signal indicating an operation condition of the fan (23, 71). It can be determined that Condition A is met if the receiving section (46) receives the first signal indicating that the fan (23, 71) is in operation.

Condition B) The imaging control unit (45) determines whether Condition B is met, based on the amount of change ΔTa or the amount of change ΔTb. The amount of change ΔTa and the amount of change ΔTb are obtained based on operation parameters or the first signals indicating values detected by the sensors (S). Specifically, the temperature Ta of the indoor heat exchanger (22) or the temperature Tb of the refrigerant flowing in the indoor heat exchanger (22) can be estimated based on an operation parameter of the refrigeration cycle of the refrigerant circuit (R). Alternatively, the temperature Ta or the temperature Tb can be detected based on a value detected by the heat exchanger temperature sensor or the refrigerant temperature sensor described above. The amount of change ΔTa is obtainable based on the temperature Ta. The amount of change ΔTb is obtainable based on the temperature Tb. Whether Condition B is met can be determined based on the amount of change ΔTa or the amount of change ΔTb.

Condition C) The imaging control unit (45) determines whether Condition C is met, based on the temperature Ta or the temperature Tb and the dew point temperature Td. The temperature Ta and the temperature Tb are obtainable in the above described manner. The dew point temperature Td is obtained based on the first signals indicating values detected by the sensors (S). Specifically, the dew point temperature Td is obtainable based on the air temperature detected by the air temperature sensor, described above, and the air humidity (relative humidity) detected by the air humidity sensor, described above. Whether Condition C is met can be determined by comparing the temperature Ta and the dew point temperature Td, or the temperature Tb and the dew point temperature Td.

The imaging control unit (45) may estimate the dew point temperature Td based on data relating to weather information. The data relating to weather information includes data in which time, a region corresponding to that time, and the temperature and humidity of outside air corresponding to that time and region are associated to each other. The data relating to weather is stored in a cloud server, for example. The imaging control unit (45) receives the data relating to weather via the Internet. The imaging control unit (45) specifies the temperature and humidity of the outside air corresponding to the indoor unit (20), based on the data relating to weather. The temperature and humidity of outside air is correlated with the temperature and humidity of room air. The temperature and humidity of room air is correlated with the temperature and humidity of air in the casing (25) of the indoor unit (20). The imaging control unit (45) can thus estimate the dew point temperature Td of air in the casing (25), based on the data relating to weather.

Alternatively, the cloud server may estimate the dew point temperature Td. In this case, the server transmits the dew point temperature to the imaging control unit (45). The imaging control unit (45) determines whether Condition C is met, based on the temperature Ta or the temperature Tb and the dew point temperature Td received.

Condition D) The imaging control unit (45) determines whether Condition D is met, based on the dew point temperature Td. Similarly to the determination as to Condition C, the dew point temperature Td is obtainable based on the air temperature detected by the air temperature sensor, and the air humidity (relative humidity) detected by the air humidity sensor. Alternatively, the dew point temperature Td may be estimated based on the data relating to weather described above.

A cloud server may estimate the dew point temperature Td based on data relating to weather. The cloud server determines whether Condition D is met, based on the estimated dew point temperature Td. Once the server determines that Condition D is met, the server transmits a command instructing image capturing to the imaging control unit (45). Receiving this command, the imaging control unit (45) causes the imaging device (41) to capture an image. In this configuration, it can be determined that the first condition is met without using an air temperature sensor or an air humidity sensor. Further, in this configuration, it can be determined that the first condition is met without transmission of values detected by sensors in the air conditioner (10) to the imaging control unit (45).

Advantages of First Embodiment

The imaging control unit (45) causes the camera (41) to capture an image under the first condition indicating that there are no mists or fewer mists in the casing (25), based on the state of the air conditioner (10). Acquiring image data by the camera (41) with mists present in the casing (25) can be reduced. Therefore, this can reduce the chances of taking unclear image data due to effects of the mists. The operator can inspect the imaging target (T) well based on the image data.

The first condition includes Condition A that the indoor fan (23) is in operation. Mists in the casing (25) can be discharged to the outside of the casing (25) while the indoor fan (23) is in operation. This can reduce the chances of taking unclear image data due to effects of the mists. The imaging control unit (45) uses only the operating state of the indoor fan (23) to determine whether the first condition is met. Processes for determining whether the first condition is met can thus be simplified.

The first condition includes Condition B that the amount of change ΔTa in temperature of the indoor heat exchanger (22) or the amount of change ΔTb in temperature of the refrigerant flowing in the indoor heat exchanger (22) is within a predetermined range in a predetermined period.

If the amount of change ΔTa or the amount of change ΔTb in the predetermined period is a predetermined value or less, it means that the indoor heat exchanger (22) is in a steady state, and air is not cooled abruptly by the indoor heat exchanger (22). Thus, in this case, mists are less likely to be generated in the casing (25). Making the camera (41) capture an image at this timing can reduce the chances of taking unclear image data due to effects of the mists. In this case, the camera (41) can capture an image even during a halt of the indoor fan (23) or during a halt of the air conditioner (10).

The indoor heat exchanger (22) is in a steady state under the following circumstances, for example.

1) The difference between the temperature of air sucked (room air) and the set temperature is a predetermined value (e.g., three degrees) or less in all the indoor units (20) in operation.

2) A predetermined period has elapsed since all the indoor units (20) stopped.

The first condition includes Condition C that the temperature Ta of the indoor heat exchanger (22) or the temperature Tb of the refrigerant flowing in the indoor heat exchanger (22) is higher than the dew point temperature Td of the air in the casing (25). If Condition C is met, it basically means that air with which the indoor heat exchanger (22) exchanges heat is not equal to or lower than the dew point temperature Td. Thus, the camera (41) can capture an image with reliability under conditions where there are no mists or fewer mists in the casing (25). In this case, the camera (41) can capture an image even during a halt of the indoor fan (23) or during a halt of the air conditioner (10).

The first condition includes a condition that the dew point temperature Td of air in the casing (25) is equal to or lower than a predetermined value. It is thus possible to determine that the first condition is met by a simple configuration.

The imaging control unit (45) is separate from the air-conditioning control unit (35). Thus, the imaging control unit (45) or the imaging unit (40) can be downsized. Moreover, the imaging control unit (45) can be retrofitted to an existing air conditioner (10).

The tray (26) and the pump (27), which are imaging targets (T), are disposed in the first space (S1) different from the air flow path (30). Since not much air flows in the first space (S1), mists tend to be generated or the mists generated tend to remain in the first space (S1). However, the imaging control unit (45) causes the camera (41) to capture an image under the first condition; therefore, the image data can be acquired under the condition where there are no mists or fewer mists with reliability.

Second Embodiment

A air conditioner (10) of a second embodiment has an indoor unit (20) configured to treat outside air. The indoor unit (20) takes outdoor air (OA) in and adjusts the temperature and humidity of the air taken in. The air whose temperature and humidity have been adjusted is supplied to the indoor space as supply air (SA). The indoor unit (20) takes room air (RA) in and discharges the air taken in to the outdoor space.

Figure 7:
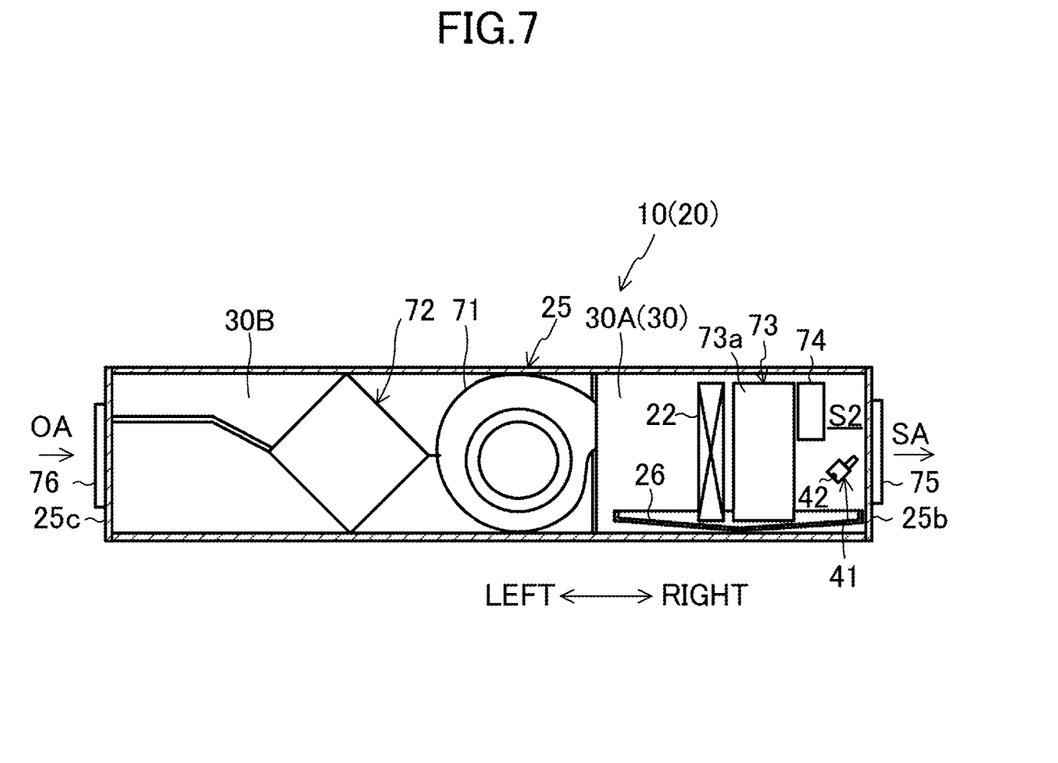
FIG. 7 is a diagram illustrating the inside of an indoor unit according to a second embodiment, as viewed from the front.

The indoor unit (20) illustrated in FIG. 7 is installed in a space behind the ceiling. The indoor unit (20) includes a casing (25), an air supply fan (71), an exhaust fan (not shown), an indoor heat exchanger (22), a total heat exchanger (72), a humidifier (73), a tank (74), and a tray (26).

The casing (25) has a shape of a rectangular parallelepiped hollow box. The casing (25) has a right-side panel (25b), where an air supply port (75) and an indoor air port (not shown) are formed. The casing (25) has a left-side panel (25c), where an outside air port (76) and an exhaust port (not shown) are formed. An air supply passage (30A), which is an air flow path, is formed in the casing (25) so as to extend from the outside air port (76) to the air supply port (75). An exhaust passage (30B) is formed in the casing (25) so as to extend from the indoor air port to the exhaust port.

The air supply fan (71) transfers air in the air supply passage (30A). The air supply fan (71) corresponds to the fan of the present disclosure. The exhaust fan transfers air in the exhaust passage (30B).

The indoor heat exchanger (22) is disposed in the air supply passage (30A). The indoor heat exchanger (22) is connected to a refrigerant circuit (R) similar to the refrigerant circuit (R) of the first embodiment. The indoor heat exchanger (22) is an air heat exchanger that allows heat exchange between the air and the refrigerant. The indoor heat exchanger (22) serves as an evaporator in a cooling operation and as a condenser (radiator) in a heating operation.

The total heat exchanger (72) allows heat exchange between the sensible heat and latent heat of air flowing in the air supply passage (30A) and the sensible heat and latent heat of air flowing in the exhaust passage (30B).

The humidifier (73) is disposed in the air supply passage (30A). The humidifier (73) has a humidifying element (73a) as a hygroscopic member. Water is supplied to the humidifying element (73a) from the tank (74). Moisture of the humidifying element (73a) is given to air while the air passes through the humidifier (73).

In the second embodiment, the camera (41) of the imaging unit (40) is disposed in the air supply passage (30A). The lens (42) of the camera (41) is directed to the humidifying element (73a) and the tray (26). The imaging target (T) of the camera (41) includes the humidifying element (73a) and the tray (26). The image data captured by the camera (41) is output to a communication terminal (60) via a server (50).

The humidifying element (73a) and the tray (26), which are the imaging targets (T), are disposed in the air flow path (30). More specifically, the humidifying element (73a) and the tray (26), which are the imaging targets (T), are disposed in a second space (S2) that is the same space where the indoor heat exchanger (22) is disposed.

Similarly to the imaging control unit (45) of the first embodiment, the imaging control unit (45) of the second embodiment causes the camera (41) to capture an image under the first condition where there are no mists or fewer mists in the casing (25). This can reduce the chances of taking unclear image data due to effects of the mists.

In the second embodiment, the imaging targets (T) are disposed in the air flow path (30). Air flows around the imaging targets (T) while the indoor fan (23) is in operation; therefore, mists around the imaging targets (T) can be discharged promptly to the outside of the casing (25). The imaging control unit (45) makes the camera (41) capture an image when Condition A is met, thus making it possible to reliably reduce the chances of taking unclear image data due to effects of the mists.

Mists are easily generated around the imaging targets (T), if the imaging targets (T) are disposed in the second space (S2), because air around the imaging targets (T) is cooled by the indoor heat exchanger (22). To address this, the imaging control unit (45) causes the camera (41) to capture an image under the first condition where there are no mists or fewer mists in the casing (25). This can reduce the chances of taking unclear image data due to effects of the mists.

The imaging control unit (45) may estimate the dew point temperature Td based on data relating to weather information in the second embodiment, as well. In the second embodiment, the outdoor air (OA) is taken into the casing (25). Thus, the imaging control unit (45) can estimate the dew point temperature Td more reliably, based on the data relating to weather information.

Third Embodiment

An air conditioner (10) according to the third embodiment includes a ceiling hanging-type or ceiling embedded-type indoor unit (20).

Figure 8:
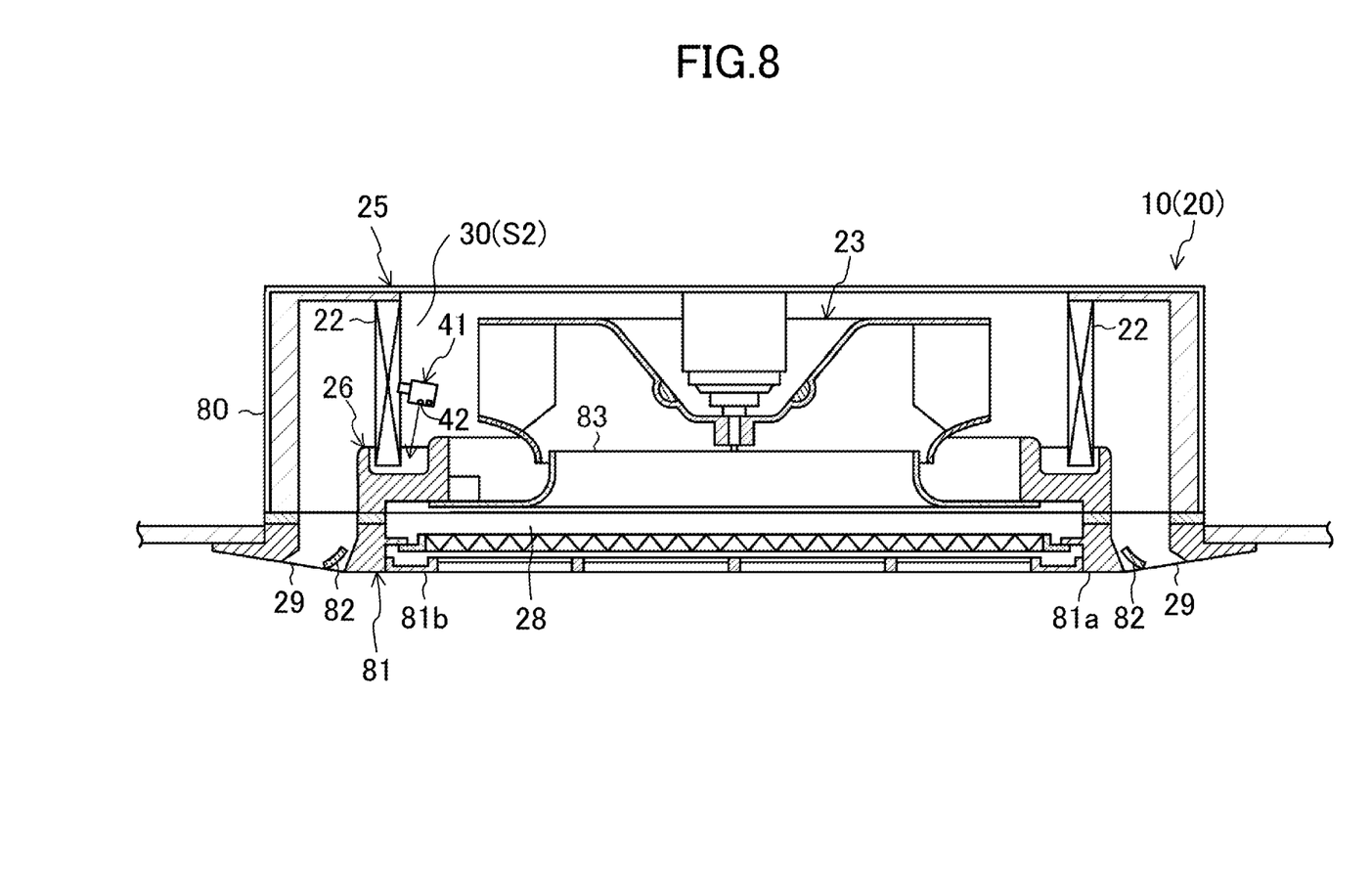
FIG. 8 is a diagram illustrating a vertical cross-sectional view of an internal structure of an indoor unit according to a third embodiment.

As illustrated in FIG. 8, the indoor unit (20) includes a casing (25) installed behind the ceiling. The casing (25) includes a casing body (80) and a panel (81). The casing body (80) has a rectangular parallelepiped box-like shape with its lower side open. The panel (81) is removably attached to the opening of the casing body (80). The panel (81) includes a rectangular frame-shaped panel body (81a) and an intake grille (81b) provided at the center of the panel body (81a).

One intake port (28) is formed in the center of the panel body (81a). The intake grille (81b) is attached to the intake port (28). Four side edge portions of the panel body (81a) each have an blow-out port (29). The blow-out ports (29) extend along the respective four side edges. A flap (82) is provided in each of the blow-out ports (29). An air flow path (30) is formed in the casing (25) from the intake port (28) to the blow-out port (29).

A bell mouth (83), an indoor fan (23), an indoor heat exchanger (22), and a tray (26) are provided in the casing body (80). The bell mouth (83) and the indoor fan (23) are disposed above the intake grille (81b). The indoor heat exchanger (22) is disposed in the air flow path (30) so as to surround the indoor fan (23). The indoor heat exchanger (22) is a fin-and-tube heat exchanger. The tray (26) is disposed below the indoor heat exchanger (22) in the air flow path (30).

The camera (41) of the third embodiment is disposed in the air flow path (30). The lens (42) of the camera (41) is directed to the bottom of the tray (26). The imaging target (T) is the tray (26).

The tray (26), which is the imaging target (T), is disposed in the air flow path (30). More specifically, the tray (26), which is the imaging target (T), is disposed in a second space (S2) that is the same space where the indoor heat exchanger (22) is disposed.

The imaging control unit (45) causes the camera (41) to capture an image under the first condition where no mists are generated in the casing (25) in the third embodiment, as well. This can reduce the chances of taking unclear image data due to effects of the mists. The third embodiment can also provide advantages that are the same as, or similar to, those of the second embodiment.

Other Embodiments

The embodiments and the variations described above may be configured as follows within an applicable range.

In the air treatment system (1) illustrated in FIG. 1, the image data acquired by the imaging unit (40) is transmitted to the communication terminal (60) via the server (50). The image data acquired by the imaging unit (40) may be transmitted directly to the communication terminal (60).

In the air treatment system (1) illustrated in FIG. 1, the first signal of the air conditioner (10) is transmitted directly to the imaging unit (40). The first signal of the air conditioner (10) may be transmitted to the imaging control unit (45) via the Internet (N).

The sensors (S) for determining whether the first condition is met may be provided in the imaging unit (40).

The imaging control unit (45) of the above embodiments may be configured by the imaging control unit (45) and the air-conditioning control unit (35) that are combined together to constitute a control unit of the present disclosure. In this case, the control unit is used for both of the imaging unit (40) and the air conditioner (10).

The imaging target (T) may be a component disposed in the casing (25) or may be a component disposed outside the casing (25). Examples of the imaging target (T) disposed in the casing (25) include a drain pump and a float switch arranged in the tray (26), an air heat exchanger (the indoor heat exchanger (22)), the total heat exchanger (72), the fan (23, 71), a filter for catching dust in the air, and so on.

The imaging device (41) may be provided in the outdoor unit (11). In this case, components in the outdoor unit (11) are the imaging targets (T) of the imaging device (41).

The imaging device is not limited to the camera (41) and may be, for example, an optical sensor or a radio-frequency sensor. The detection accuracy of the optical sensor and that of the radio-frequency sensor decrease due to mists generated in the casing.

The image data to be acquired by the imaging device (41) is not limited to static images and may be moving images.

The air treatment device may be another device as long as the device has a casing through which air flows. The air treatment device may be a humidity control apparatus, a ventilator, or an air cleaner. The humidity control apparatus controls the humidity of the air in the target space. The ventilator ventilates the target space. The air cleaner purifies air in the target space.

While the embodiments and variations thereof have been described above, it will be understood that various changes in form and details may be made without departing from the spirit and scope of the claims. The embodiments, the variations, and the other embodiments may be combined and replaced with each other without deteriorating intended functions of the present disclosure.

The ordinal numbers such as "first," "second," "third," . . . described above are used to distinguish the terms to which these expressions are given, and do not limit the number and order of the terms.

INDUSTRIAL APPLICABILITY

The present disclosure is useful for an imaging unit and an air treatment unit.

EXPLANATION OF REFERENCES

5 Air Treatment Unit
10 Air Conditioner (Air Treatment Device)
23 Indoor Fan (Fan)
25 Casing
26 Tray (Imaging Target)
27 Pump (Imaging Target)
30 Air Flow Path
40 Imaging Unit
41 Camera (Imaging Device)
45 Imaging Control Unit (Control Unit)
71 Air Supply Fan (Fan)
73a Humidifying Element (Imaging Target)
T Imaging Target
S1 Front Space (First Space)
S2 Second Space

The invention claimed is:

1. An imaging unit comprising:
   an imaging device configured to capture an image of an imaging target in a casing of an air treatment device and acquire image data of the imaging target; and
   a controller configured to cause the imaging device to capture an image under a condition indicating that there are no mists or fewer mists in the casing, based on a state of the air treatment device, wherein
   the condition includes a condition that a fan of the air treatment device is in operation.

2. An air treatment unit comprising:
   an air treatment device having a casing;
   an imaging target in the casing; and
   an imaging unit,
   the imaging unit comprising:
      an imaging device configured to capture an image of the imaging target in the casing and acquire image data of the imaging target; and
      a controller configured to cause the imaging device to capture an image under a condition indicating that there are no mists or fewer mists in the casing, based on a state of the air treatment device,
   the air treatment unit further comprising:
   a fan configured to transfer air in an air flow path in the casing, wherein
   the imaging target is disposed in the air flow path, and
   the controller causes the imaging device to capture an image when the fan is in operation.

* * * * *